US010932246B2

United States Patent
Gao et al.

(10) Patent No.: US 10,932,246 B2
(45) Date of Patent: Feb. 23, 2021

(54) METHODS AND DEVICES FOR DYNAMICALLY DETERMINING TRANSMISSION LOCATIONS OF UL DMRS

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/322,908

(22) PCT Filed: Jul. 5, 2017

(86) PCT No.: PCT/CN2017/091776
§ 371 (c)(1),
(2) Date: Feb. 1, 2019

(87) PCT Pub. No.: WO2018/024068
PCT Pub. Date: Feb. 8, 2018

(65) Prior Publication Data
US 2019/0182810 A1    Jun. 13, 2019

(30) Foreign Application Priority Data

Aug. 4, 2016 (CN) .......................... 201610634461.3

(51) Int. Cl.
*H04W 72/04* (2009.01)
*H04L 5/00* (2006.01)

(52) U.S. Cl.
CPC ......... *H04W 72/042* (2013.01); *H04L 5/0005* (2013.01); *H04L 5/0048* (2013.01);
(Continued)

(58) Field of Classification Search
CPC ............... H04W 72/04; H04W 72/042; H04W 72/0446; H04L 5/00; H04L 5/0091; H04L 5/0048; H04L 5/0051; H04L 5/0005
See application file for complete search history.

(56) References Cited

U.S. PATENT DOCUMENTS 9,374,724 B2 * 6/2016 Åhlander ............ H04L 25/0224
2012/0051319 A1    3/2012 Kwon et al.
(Continued)

FOREIGN PATENT DOCUMENTS

| CN | 102065545 A | 5/2011 |
| CN | 103795513 A | 5/2014 |

(Continued)

OTHER PUBLICATIONS

"UL Channel Design for Shortened TTI", R1-163069, 3GPPTSG RAN WG1 #84b, Busan, Korea, Apr. 11-15, 2016. (Year: 2016).*
(Continued)

*Primary Examiner* — Kyaw Z Soe
(74) *Attorney, Agent, or Firm* — Ladas & Parry, LLP

(57) ABSTRACT

Embodiments of the present disclosure provide methods and devices for dynamically determining a transmission location of an Uplink (UL) DeModulation Reference Signal (DMRS), including: receiving, by a terminal, a DownLink (DL) control channel; and determining, by the terminal, the transmission location of the UL DMRS according to the DL control channel.

16 Claims, 4 Drawing Sheets

(52) U.S. Cl.
CPC .......... *H04L 5/0051* (2013.01); *H04L 5/0091* (2013.01); *H04W 72/04* (2013.01); *H04W 72/0446* (2013.01); *H04L 5/0055* (2013.01)

(56) References Cited

U.S. PATENT DOCUMENTS

| | | | | |
|---|---|---|---|---|
| 2014/0301346 | A1* | 10/2014 | Seo | H04L 5/0048 370/329 |
| 2018/0279239 | A1* | 9/2018 | Si | H04W 76/28 |

FOREIGN PATENT DOCUMENTS

| | | | |
|---|---|---|---|
| CN | 103944665 | A | 7/2014 |
| EP | 2941080 | A1 | 1/2013 |
| WO | 2013066224 | A1 | 5/2013 |
| WO | 2016048597 | A1 | 3/2016 |
| WO | 2016064049 | A1 | 4/2016 |
| WO | 2017119720 | A2 | 7/2017 |
| WO | 2017132841 | A1 | 8/2017 |

OTHER PUBLICATIONS

Qualcomm Incorporated; "UL Channel Design for Shortened TTI", 3GPP TSG RAN WG1 #85, R1-164459, May 27, 2016 (May 27, 2016).

International Search Report for PCT/CN2017/091776 dated Sep. 28, 2017 and its English translation provided by WIPO.

Written Opinion of the International Search Authority for PCT/CN2017/091776 dated Sep. 28, 2017 and its English translation provided by Google Translate.

Extended European Search Report from EP app. No. 17836250.5, dated Jun. 28, 2019.

Written Opinion of the International Searching Authority from PCT/CN2017/091776, dated Sep. 28, 2017, with English translation from WIPO.

International Preliminary Report on Patentability from PCT/CN2017/091776, dated Feb. 5, 2019, with English translation from WIPO.

"TTI shortening and reduces processing time for UL transmissions", R1-160906, 3GPP TSG RAN WG1 #84, St. Julian's, Malta, Feb. 15-19, 2016.

"UL Channel Design for Shortened TTI", R1-163069, 3GPP TSG RAN WG1 #84b, Busan, Korea, Apr. 11-15, 2016.

"UL design aspects of TTI shortening", R1-164162, 3GPP TSG-RAN WG1 #85, Nanjing, China, May 23-27, 2016.

"On UL sTTI layout", R1-1611508, 3GPP TSG-RAN WG1 #87, Reno, USA, Nov. 14-18, 2016.

First office action and search report from CN app. No. 201610634461.3. dated Mar. 3, 2020 with English translation from Global Dossier.

Notification of reasons for refusal from JP app. No. 2019-505470, dated Jan. 8, 2020, with English translation from Global Dossier.

"DCI bit fields for short TTI uplink transmissions", R1-160941, 3GPP TSG RAN WG1 Meeting #84, Malta, Feb. 15-19, 2016.

Communication pursuant to Article 94(3) EPC from EP app. No. 17836250.5, dated May 12, 2020.

* cited by examiner

METHODS AND DEVICES FOR DYNAMICALLY DETERMINING TRANSMISSION LOCATIONS OF UL DMRS

CROSS-REFERENCE TO RELATED APPLICATIONS

This application is the U.S. national phase of PCT Application No. PCT/CN2017/091776 filed on Jul. 5, 2017, which claims the benefit and priority of Chinese Application No. 201610634461.3, filed on Aug. 4, 2016. The disclosures of the above applications are incorporated herein by reference in their entireties.

TECHNICAL FIELD

The present disclosure relates to a communication technology field, and more particularly to methods and devices for dynamically determining transmission locations of an UpLink (UL) DeModulation Reference Signal (DMRS).

BACKGROUND

The Long Term Evolution (LTE) Frequency Division Dual (FDD) system uses Frame Structure type 1 (called FS1 for short), structure of which is shown in FIG. 1. In the FDD system, UL transmission and DownLink (DL) transmission use different carrier frequencies, both the UL transmission and DL transmission use the same frame structure. On each carrier, a 10 ms wireless frame includes 10 sub-frames, each of which is 1 ms. Each sub-frame includes two timeslots, each of which is 0.5 ms long. The Transmission Time Interval (TTI) of the UL and DL data transmission is 1 ms.

The existing LTE Time Division Duplex (TDD) system uses Frame Structure type 2 (called FS2 for short), as shown in FIG. 2. In the TDD system, the UL transmission and DL transmission uses different sub-frames or different timeslots on the same frequency. In the FS2, each 10 ms wireless frame is constituted by two 5 ms half-frames and each half frame includes 5 sub-frames, each of which is 1 ms. Sub-frames of the FS2 are divided into three types, i.e. DL sub-frames, UL sub-Frames and special sub-frames. Each special sub-frame is constituted by three parts, i.e. Downlink Pilot Time Slot (DwPTS), Guard Period (GP) and Uplink Pilot Time Slot (UpPTS). Each half-frame includes at least one DL sub-frame, at least one UL sub-frame and at most one special sub-frame.

A relative typical working mode of the short TTI transmission is that the sub-frame structure defined in the existing mechanism of the LTE includes multiple short TTI transmission, which is shorter than 1 ms. The length of the short TTI may be two, three, four or seven Orthogonal Frequency Division Multiplexing (OFDM) symbols or Single-Carrier Frequency Division Multiple Access (SC-FDMA) symbols. Certainly, the other situation that number of symbols does not exceed 14 or the length of the time domain does not exceed 1 ms is not excluded. One sub-frame includes multiple short TTIs, each short TTI may be scheduled to one terminal or different terminals to execute shortened Physical Uplink Control Channel (sPUCCH) transmission or shortened Physical Uplink Shared Channel (sPUSCH) transmission.

In the LTE system, both the channel transmission and DMRS pattern are defined in units of sub-frame. The TTI transmission supports various TTI lengths and one sub-frame includes multiple short TTI transmission chances. If each short TTI includes the DMRS, the DMRS overhead is too much.

Therefore, in the existing standard of the LTE system, there is no DMRS scheme for the short TTI transmission.

SUMMARY

In view of the above technical problem, embodiments of the present disclosure provide methods and devices for dynamically determining transmission locations of an UL DMRS, to solve a technical problem of dynamically determining the transmission locations of the UL DMRS and reducing the DMRS overhead of the short TTI transmission.

According to a first aspect of the embodiments of the present disclosure, a method for dynamically determining a transmission location of an UpLink (UL) DeModulation Reference Signal (DMRS) is provided. The method includes; receiving, by a terminal, a DownLink (DL) control channel; and determining, by the terminal, the transmission location of the UL DMRS according to the DL control channel.

Optionally, the DL control channel is a DL control channel with an UL Downlink Control Information (DCI) format; determining, by the terminal, the transmission location of the UL DMRS according to the DL control channel includes: determining, by the terminal according to the DL control channel, the transmission location of the DMRS of a shortened Physical Uplink Shared CHannel (sPUSCH), which is scheduled by the DL control channel.

Optionally, the sPUSCH and DMRS use different scheduling timings.

Optionally, the method further includes: predefining that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or predefining that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or predefining that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or predefining that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or predefining that the DL control channel, which is transmitted in the sub-frame with the number of n or the short TTI and uses the UL DCI format, schedules the sPUSCH, which is transmitted on the (n+k)th timing domain location, or predefining that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, the method further includes: predefining multiple UL DMRS patterns, wherein each DMRS pattern at least includes division of each short TTI and a location, at which the DMRS is located, in each sub-frame or time slot, or each DMRS pattern at least includes a relative location relationship between the DMRS and the short TTI, an indication field of the DL control channel indicates one of the predefined multiple UL DMRS patterns.

Optionally, the DL control channel is a DL control channel using a DL DCI format; determining, by the terminal, the transmission location of the UL DMRS according to the DL control channel includes: determining, by the terminal according to the DL control channel, the transmission location of the DMRS, which transmits the shortened Physical Uplink Control Channel (sPUCCH) of ACK/NACK feedback information corresponding to the DL control channel.

Optionally, the sPUCCH and DMRS use different scheduling timings.

Optionally, the method further includes: predefining that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel m1 and m2 are values notified by the DL control channel units of k, m1 and m2 are sub-frames, short TTIs or Single-Carrier Frequency Division Multiple Access (SC-FDMA) symbols, n is natural number; or predefining that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or predefining that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or predefining that the DL control channel which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or predefining that the DL control channel, which is transmitted in the sub-frame with the number of n or the short TTI and uses the DL DCI format, schedules the sPUCCH, which is transmitted on the (n+k)th timing domain location, or predefining that the DL control channel which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol m a sub-frame or time slot, at which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, when multiple terminal Time Division Multiplexing (TDM) uses different UL short TTI transmission, multiple UL short TTI transmission shares a same time domain location to transmit the DMRS and the DL control channel indicates that the DMRS is transmitted on a specific location of a time slot/sub-frame.

Optionally, when a terminal is consecutively scheduled in multiple UL short TTI transmission, the DL control channel indicates that the DMRS is transmitted between the multiple UL short TTIs, in which the terminal is scheduled.

According to a second aspect of embodiments of the present disclosure, a method for dynamically determining a transmission location of an UpLink (UL) DeModulation Reference Signal (DMRS) is provided. The method includes; determining, by an eNB, a transmission location of the UL DMRS; and transmitting, by the eNB, a Downlink (DL) control channel to notify a terminal of determining information of the transmission location of the UL DMRS.

Optionally, the DL control channel is a DL control channel with an UL Downlink Control Information (DCI) format; determining, by the eNB, the transmission location of the UL DMRS includes: determining, by the eNB, the transmission location of the DMRS of a shortened Physical Uplink Shared Channel (sPUSCH), which is scheduled by the DL control channel, and notifying the terminal of determining the information of the transmission location of the DMRS via the DL control channel.

Optionally, the sPUSCH and DMRS use different scheduling timings.

Optionally, the method further includes: predefining that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location m the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or predefining that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or predefining that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or predefining that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m1 are sub-frames, short TTIs or SC-FDMA symbols, n is the natural number; or predefining that the DL control channel, which is transmitted in the sub-frame with the number of n or the short TTI and uses the UL DCI format, schedules the sPUSCH, which is transmitted on the (n+k)th timing domain location, or predefining that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, the method further includes: predefining multiple UL DMRS patterns, wherein each DMRS pattern at least includes division of each short TTI and a location, at which the DMRS is located, in each sub-frame or time slot, or each DMRS pattern at least includes a relative location relationship between the DMRS and the short TTI, an indication field of the DL control channel indicates one of the predefined multiple UL DMRS patterns.

Optionally, the DL control channel is a DL control channel using a DL DCI format; determining, by the eNB, the transmission location of the UL DMRS includes: determining, by the eNB, the transmission location of the DMRS, which transmits the sPUCCH of ACK/NACK feedback information corresponding to the DL control channel and notifying the terminal of determining the information of the transmission location of the DMRS via the DL control channel.

Optionally, the sPUCCH and DMRS use different scheduling timings.

Optionally, the method further includes: predefining that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols; or predefining that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel units of k1, k2, m1 and m2 are sub-frames, short TTIs or SC-FDMA symbols, n is natural number; or predefining that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or predefining that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or predefining that the DL control channel, which is transmitted in the sub-frame with the number of n or the short TTI and uses the DL DCI format, schedules the sPUCCH, which is transmitted on the (n+k)th timing domain location, or predefining that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, when multiple terminal Time Division Multiplexing (TDM) uses different UL short TTI transmission, multiple UL short TTI transmission share a same time domain location to transmit the DMRS and the DL control channel indicates that the DMRS is transmitted on a specific location of a time slot/sub-frame.

Optionally, when a terminal is consecutively scheduled in multiple UL short TTI transmission, the DL control channel indicates that the DMRS is transmitted between the multiple DL short TTIs, in which the terminal is scheduled.

According to a third aspect of the embodiments of the present disclosure, a terminal is provided. The terminal includes: a receiving module, to receive a DownLink (DL) control channel; and a first determination module, to determine a transmission location of an Uplink (UL) DeModulation Reference Signal (DMRS) according to the DL control channel.

Optionally, the DL control channel is a DL control channel with an UL Downlink Control Information (DCI) format; the first determination module is further to determine, according to the DL control channel, the transmission location of the DMRS of a shortened Physical Uplink Shared CHannel (sPUSCH), which is scheduled by the DL control channel.

Optionally, the sPUSCH and DMRS use different scheduling timings.

Optionally, the terminal further includes: a first configuration module, to predefine that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or predefine that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or predefine that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a precon-figured value or a value notified by the DL control channel, m2 is a value notified by the DL control channel, units of k and m2 are sub-frames, short TTIs or SC-FDMA symbols, n is the natural number; or predefine that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or predefine that the DL control channel, which is transmitted in the sub-frame with the number of n or the short TTI and uses the UL DCI format, schedules the sPUSCH, which is transmitted on the (n+k)th timing domain location, or predefine that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, the terminal further includes: a second configuration module, to predefine multiple UL DMRS patterns, wherein each DMRS pattern at least includes division of each short TTI and a location, at which the DMRS is located, in each sub-frame or time slot, or each DMRS pattern at least includes a relative location relationship between the DMRS and the short TTI, an indication field of the DL control channel indicates one of the predefined multiple UL DMRS patterns.

Optionally, the DL control channel is a DL control channel using a DL DCI format; the first determination module is further to determine, according to the DL control channel, the transmission location of the DMRS, which transmits the shortened Physical Uplink Control Channel (sPUCCH) of ACK/NACK feedback information corresponding to the DL control channel.

Optionally, the sPUCCH and DMRS use different scheduling timings.

Optionally, the terminal further includes: a third configuration module, to predefine that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or predefine that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or predefine that the DL control channel, which is transmitted in the sub-frame with the number of n or the short TTI and uses the DL DCI format, schedules the sPUCCH, which is transmitted en the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or predefine that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2, and m2 are sub-frames, short TTIs or SC-FDMA symbols, n is the natural number; or predefine that the DL control channel, which is transmitted in the sub-frame with the number of n or the short TTI and uses the DL DCI format, schedules the sPUCCH, which is transmitted on the (n+k)th timing domain location, or predefine that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot at which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, when multiple terminal Time Division Multiplexing (TDM) uses different UL short TTI transmission, multiple UL short TTI transmission shares a same time domain location to transmit the DMRS and the DL control channel indicates that the DMRS is transmitted on a specific location of a time slot/sub-frame.

Optionally, when a terminal is consecutively scheduled in multiple UL short TTI transmission, the DL control channel indicates that the DMRS is transmitted between the multiple UL short TTIs, in which the terminal is scheduled.

According to a fourth aspect of the embodiments of the present disclosure, an eNB is provided. The eNB includes: a second determination module, to determine a transmission location of an UpLink (UL) DeModulation Reference Signal (DMRS); and a notification module, to transmit a DownLink (DL) control channel to notify a terminal of determining information of the transmission location of the UL DMRS.

Optionally, the DL control channel is a DL control channel with an UL Downlink Control Information (DCI) format; the second determination is further to determine the transmission location of the DMRS of a shortened Physical Uplink Shared Channel (sPUSCH), which is scheduled by the DL control channel, and notify the terminal of determining the information of the transmission location of the DMRS via the DL control channel.

Optionally, the sPUSCH and DMRS use different scheduling timings.

Optionally, the eNB further includes: a fourth configuration module, to predefine that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or predefine that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or predefine that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or predefine that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m1 is a value notified by the DL control channel, units of k1, k2 and m2 are sub-frames, short TTIs or SC-FDMA symbols, n is the natural number; or predefine that the DL control channel, which is transmitted in the sub-frame with the number of n or the short TTI and uses the UL DCI format, schedules the sPUSCH, which is transmitted on the (n+k)th timing domain location, or predefine that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, the eNB further includes: a fifth configuration module, to predefine multiple UL DMRS patterns, wherein each DMRS pattern at least includes division of each short TTI and a location, at which the DMRS is located, in each sub-frame or time slot, or each DMRS pattern at least includes a relative location relationship between the DMRS and the short TTI, an indication field of the DL control channel indicates one of the predefined multiple UL DMRS patterns.

Optionally, the DL control channel is a DL control channel using a DL DCI format; the second determination module is further to determine the transmission location of the DMRS, which transmits the sPUCCH of ACK/NACK feedback information corresponding to the DL control channel and notify the terminal of determining the information of the transmission location of the DMRS via the DL control channel.

Optionally, the sPUCCH and DMRS use different scheduling timings.

Optionally, the eNB further includes: a sixth configuration module, to predefine that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols; or predefine that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols; or predefine that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols; or predefine that the DL control channel, which is transmitted in the sub-frame with the number of n or the short TTI and uses the DL DCI format, schedules the sPUCCH which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols; or predefine that the DL control channel, which is transmitted in the sub-frame with the number of n or the short TTI and uses the DL DCI format, schedules the sPUCCH, which is transmitted on the (n+k)th timing domain location, or predefine that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, when multiple terminal Time Division Multiplexing (TDM) uses different UL short TTI transmission, multiple UL short TTI transmission share a same time domain location to transmit the DMRS and the DL control channel indicates that the DMRS is transmitted on a specific location of a time slot/sub-frame.

Optionally, when a terminal is consecutively scheduled in multiple UL short TTI transmission, the DL control channel indicates that the DMRS is transmitted between the multiple DL short TTIs, in which the terminal is scheduled.

Any of the above technical schemes has following merits and advantages: the DMRS location of the UL transmission is obtained via the DL control channel. Therefore, an insert location of the DMRS is determined according to the transmission situation of the sPUSCH/sPUCCH. On the one hand, the DMRS overhead of the short TTI transmission may be reduced. On the other hand, the demodulation performance of the DMRS may be improved.

DETAILED DESCRIPTION

Exemplary embodiments of the present disclosure will be described in detail hereinafter with reference to accompanying drawings. Although the accompanying drawings show the exemplary embodiments of the present disclosure, it should be understood that the present disclosure may be implemented with various modes and should not be limited to the embodiments described herein. On the contrary, these embodiments are provided to more completely understand the present disclosure and completely convey the scope of the present disclosure to those skilled in the art.

It is well known to those skilled in the art that embodiments of the present disclosure may be implemented as a system, apparatus, device, method or computer program product. Therefore, embodiments of the present disclosure may be implemented as; hardware-only, software-only (includes firmware, resident software and microcode, etc.), or the combination of the hardware and software.

In embodiments of the present disclosure, related devices may include eNBs and terminals. The eNB may perform DL transmission and UL receiving between the eNB and a terminal, which accesses the eNB.

The terminal also may be called the User Equipment (called the UE for short), or called Terminal, Mobile Station (called MS for short), Mobile Terminal, etc. The terminal communicates with one or multiple core networks via a Radio Access Network (called RAN for short). For instance, the terminal may be a mobile phone (or called "cell" phone), a computer equipped with the mobile terminal, etc. For instance, the terminal also may be a portable, pocket and handheld mobile device with a built-in computer or on-board mobile device. The device exchanges voice and/or data with the RAN. The terminal in embodiments of the present disclosure also may be the Device to Device (D2D) terminal or Machine to Machine (M2M) terminal.

Figure 1:
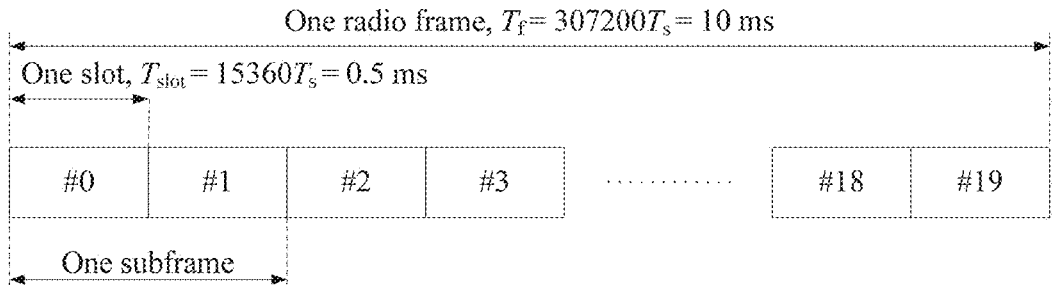
FIG. 1 is a schematic diagram illustrating frame structure used by the LTE FDD system.
Figure 2:
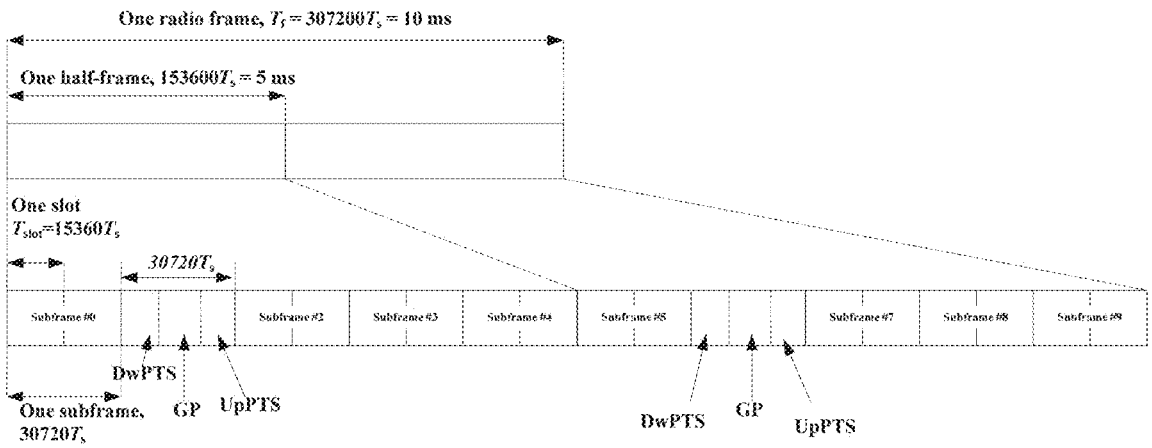
FIG. 2 is a schematic diagram illustrating frame structure used by the LTE FDD system.
Figure 3:
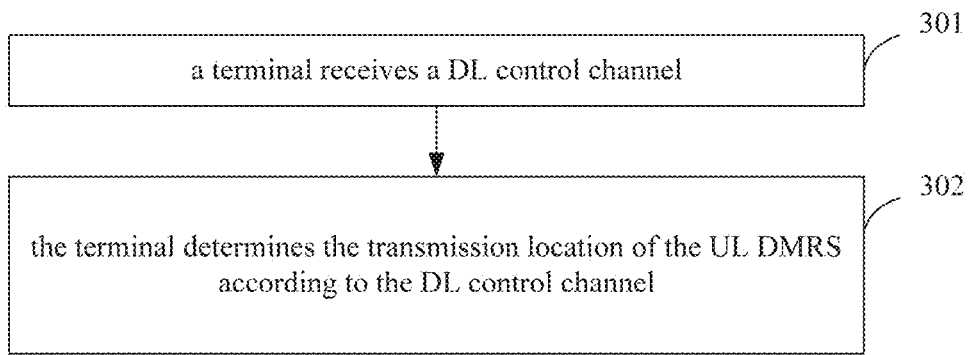
FIG. 3 is a flaw chart illustrating a method for dynamically determining transmission locations of the UL DMRS according to various embodiments of the present disclosure.

In some embodiments, referring to FIG. 3, FIG. 3 illustrates a method for dynamically determining transmission locations of the UL DMRS. The specific blocks are as follows: At block 301, a terminal receives a DL control channel. At block 302, the terminal determines the transmission location of the UL DMRS according to the DL control channel.

Optionally, in this embodiment, the DL control channel is a DL control channel with an UL DownLink Control Information (DCI) format. In the above block 302, determining, by the terminal, the transmission location of the UL DMRS according to the DL control channel includes: determining, by the terminal, the transmission location of the DMRS of a shortened Physical Uplink Shared CHannel (sPUSCH), which is scheduled by the DL control channel, according to the DL control channel.

Optionally, in this embodiment, the sPUSCH and DMRS use different scheduling timings.

Optionally, in this embodiment, the method further includes: predefining that the DL control channel, which is transmitted in a sub-frame with the number of n or a short Transmission Time Interval (TTI) and uses the UL DCI format, schedules the sPUSCH, which is transmitted on the (n+k+m1)th (n+k+m1 denotes a time domain location, which delays (k+m1) units in relative to the sub-frame with the number of n or the short TTI) timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols (in one embodiment, the unit of k is the sub-frame or short TTI, the units of m1 and m2 are the SC-FDMA symbols, in another embodiment, the units of k and m1 are the sub-frames or short TTIs and the unit of m2 is the SC-FDMA symbol), n is natural number. Alternatively, the method further includes: predefining that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols (in one embodiment, the units of k1 and k2 are the sub-frames or short TTIs, the units of m1 and m2 are the SC-FDMA symbols, in another embodiment, the units of k1, k2 and m1 are the sub-frames or short TTIs and the unit of m2 is SC-FDMA symbol), n is the natural number. Alternatively, the method further includes: predefining that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols (in one embodiment, the unit of k is the sub-frame or short TTI, the unit of m2 is the SC-FDMA symbol), n is the natural number. Alternatively, the method further includes: predefining that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols (in one embodiment, the units of k1 and k2 are the sub-frames or short TTIs, the unit of m2 is the SC-FDMA symbol), n is the natural number. Alternatively, the method further includes: predefining that the DL control channel, which is transmitted in the sub-frame with the number of n or the short TTI and uses the UL DCI format, schedules the sPUSCH, which is transmitted on the (n+k)th timing domain location, or predefining that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols (in one embodiment, the unit of k is the sub-frame or short TTI, the unit of m is the SC-FDMA symbol, in another embodiment, the units of k and m are the sub-frames or short TTIs), n is the natural number.

Wherein, the m1 and m2 need to be predefined, preconfigured or notified by the DL control channel for the sPUSCH and DMRS, the unit of m1 and the unit of m2 may be the same (for instance, both of them may be the SC-FDMA symbols) or may be different (for instance, the unit of m1 is the sub-frame or short TTI and the unit of m2 is the SC-FDMA symbol).

Optionally, in this embodiment, the method further includes: predefining multiple UL DMRS patterns. Wherein each DMRS pattern at least includes division of each short TTI and a location, at which the DMRS is located, in each sub-frame or time slot. Alternatively, each DMRS pattern at least includes a relative location relationship between the DMRS and the short TTI and an indication field of the DL control channel indicates one of the multiple predefined UL DMRS patterns.

Optionally, in this embodiment, the DL control channel is a DL control channel using a DL DCI format (i.e., the DL grant or the DL control channel indicating release of the DL Semi Persistent Scheduling (SPS) resources).

In the above block 302, determining, by the terminal, the transmission location of the UL DMRS according to the DL control channel includes: determining, by the terminal according to the DL control channel, the transmission location of the DMRS, which transmits the sPUCCH of ACK/NACK feedback information corresponding to the DL control channel.

Optionally, in this embodiment, the sPUSCH and DMRS use different scheduling timings.

Optionally, in this embodiment the method further includes; predefining that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols (in one embodiment, the unit of k is the sub-frame or short TTI, the units of m1 and m2 are the SC-FDMA symbols, in another embodiment, the units of k and m1 are the sub-frames or short TTIs and the unit of m2 is SC-FDMA symbol), n is natural number. Alternatively, the method further includes: predefining that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols (in one embodiment, the units of k1 and k2 are the sub-frames or short TTIs, the units of m1 and m2 are the SC-FDMA symbols, in another embodiment, the units of k1, k2 and m1 are the sub-frames or short TTIs and the unit of m2 is the SC-FDMA symbol), n is the natural number.

Alternatively, the method further includes: predefining that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols (in one embodiment, the unit of k is the sub-frame or short TTI, the unit of m2 is the SC-FDMA symbol), n is the natural number. Alternatively, the method further includes: predefining that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2) th timing domain location, k1 and k2 are predefined values, preconfigured values or values notified by the DL control channel, m2 is a value notified by the DL control channel, units of k1, k2 and m2 are sub-frames, short TTIs or SC-FDMA symbols (in one embodiment, the units of k1 and k2 are the sub-frames or short TTIs, the unit of m2 is the SC-FDMA symbol), n is the natural number. Alternatively, the method further includes: predefining that the DL control channel, which is transmitted in the sub-frame with the number of n or the short TTI and uses the DL DCI format, schedules the sPUCCH, which is transmitted on the (n+k)th timing domain location, or predefining that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel, m is a value notified by the DL, control channel, units of k and m are sub-frames, short TTIs or SC-FDMA symbols (in one embodiment, the unit of k is the sub-frame or short TTI, the unit of m is the SC-FDMA symbol, in another embodiment, the units of k and m are the sub-frames or short TTIs), n is the natural number.

Wherein, m1 and m2 are different and need to be predefined, preconfigured or notified by the DL control channel for the sPUCCH and DMRS. Optionally, in this embodiment, when multiple terminal Time Division Multiplexing (TDM) uses different UL short TTI transmission, multiple UL short TTI transmission share a same time domain location to transmit the DMRS and the DL control channel indicates that the DMRS is transmitted on a specific location of a time slot/sub-frame, e.g., on a first symbol of a time slot/sub-frame, or on other locations of a time slot/sub-frame.

Optionally, in this embodiment, when a terminal is consecutively scheduled in multiple UL short TTI transmission, the DL control channel indicates that the DMRS is transmitted between the multiple UL short TTIs, in which the terminal is scheduled, e.g., between the i-th UL short TTI and (i+1)th UL short TTI in the multiple UL short TTIs. The multiple UL short TTI transmission share a same time domain location to transmit the DMRS or the channel estimation of the multiple UL short TTI transmission is based on the same DMRS.

In this embodiment, the DMRS location of the UL transmission is obtained via the DL control channel. Therefore, an insert location of the DMRS is determined according to the transmission situation of the sPUSCH/sPUCCH. On the one hand, the DMRS overhead of the short TTI transmission may be reduced. On the other hand, the demodulation performance of the DMRS may be improved.

Figure 4:
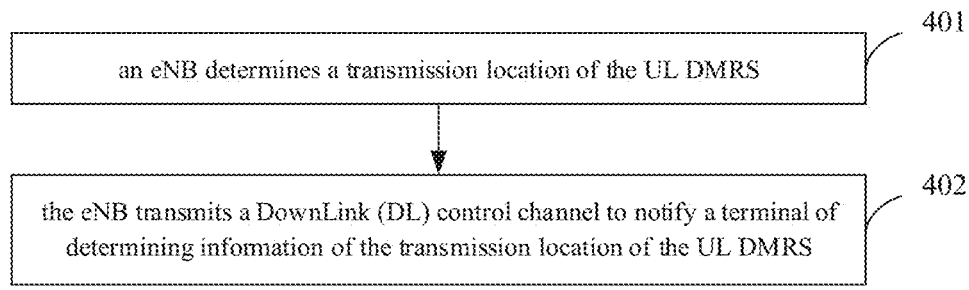
FIG. 4 is a flow chart illustrating a method for dynamically determining transmission locations of the UL DMRS according to various embodiments of the present disclosure.

In some embodiments, referring to FIG. 4, FIG. 4 shows a method for dynamically determining transmission locations of the UL DMRS. The specific blocks are as follows: At block 401, an eNB determines a transmission location of the UL DMRS. At block 402, the eNB transmits a Down-Link (DL) control channel to notify a terminal of determining information of the transmission location of the UL DMRS.

Optionally, in this embodiment, the DL control channel is a DL control channel with an UL Downlink Control Information (DCI) format. In the above block 401, determining, by the eNB, the transmission location of the UL DMRS includes: determining, by the eNB, the transmission location of the DMRS of a shortened Physical Uplink Shared Channel (sPUSCH), which is scheduled by the DL control channel, and notifying the terminal of determining the information of the transmission location of the DMRS via the DL control channel.

Optionally, in this embodiment, the sPUSCH and DMRS use different scheduling timings.

Optionally, in this embodiment, the method further includes: predefining that the DL control channel, which is transmitted in a sub-frame with the number of n or a short Transmission Time Interval (TTI) and uses the UL DCI format, schedules the sPUSCH, which is transmitted on the (n+k+m1)th (n+k+m1 denotes a time domain location, which delays (k+m1) units in relative to the sub-frame with the number of n or the short TTI) timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols (in one embodiment, the unit of k is the sub-frame or short TTI, the units of m1 and m2 are the SC-FDMA symbols, in another embodiment, the units of k and m1 are the sub-frames or short TTIs and the unit of m2 is the SC-FDMA symbol), n is natural number. The method further includes: predefining that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols (in one embodiment, the units of k1 and k2 are the sub-frames or short TTIs, the units of m1 and m2 are the SC-FDMA symbols, in another embodiment, the units of k1, k2 and m1 are the sub-frames or short TTIs and the unit of m2 is the SC-FDMA symbol), n is the natural number. The method further includes: predefining that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel m2 is a value notified by the DL control channel, units of k and m2 are sub-frames, short TTIs or SC-FDMA symbols (in one embodiment, the unit of k is the sub-frame or short TTI and the unit of m2 is the SC-FDMA symbol), n is the natural number. The method further includes: predefining that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols (in one embodiment, the units of k1 and k2 are the sub-frames or short TTIs and the unit of m2 is the SC-FDMA symbol), n is the natural number. The method further includes: predefining that the DL control channel, which is transmitted in the sub-frame with the number of n or the short TTI and uses the UL DCI format, schedules the sPUSCH, which is transmitted on the (n+k)th timing domain location, or predefining that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot at which the sPUSCH transmission scheduled by the DL control channel is located, k is a predefined value, a preconfigured value or a value notified by the DL control channel, m is a value notified by the DL control channel, units of k and m are sub-frames, short TTIs or SC-FDMA symbols (in one embodiment, the unit of k is the sub-frame or short TTI, the unit of m is the SC-FDMA symbol, in another embodiment, the units of k and m are the sub-frames or short TTIs), n is the natural number.

Wherein, the m1 and m2 need to be predefined, preconfigured or notified by the DL control channel for the sPUSCH and DMRS, the unit of m1 and the unit of m2 may be the same (for instance, both of them may be the SC-FDMA symbols) or may be different (for instance, the unit of m1 is the sub-frame or short TTI and the unit of m2 is the SC-FDMA symbol).

Optionally, in this embodiment, the method further includes: predefining multiple UL DMRS patterns, wherein each DMRS pattern at least includes division of each short TTI and a location, at which the DMRS is located, in each sub-frame or time slot, or each DMRS pattern at least includes a relative location relationship between the DMRS and the short TTI, an indication field of the DL control channel indicates one of the predefined multiple UL DMRS patterns.

Optionally, in this embodiment, the DL control channel is a DL control channel using a DL DCI format. At the above block 401, determining, by the eNB, the transmission location of the UL DMRS includes: determining, by the eNB, the transmission location of the DMRS, which transmits the sPUCCH of ACK/NACK feedback information corresponding to the DL control channel, and notifying the terminal of determining the information of the transmission location of the DMRS via the DL control channel.

Optionally, in this embodiment, the sPUCCH and DMRS use different scheduling timings.

Optionally, in this embodiment, the method further includes: predefining that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols (in one embodiment, the unit of k is the sub-frame or short TTI, the units of m1 and m2 are the SC-FDMA symbols, in another embodiment, the units of k and m1 are the sub-frames or short TTIs and the unit of m2 is the SC-FDMA symbol). The method further includes; predefining that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols (in one embodiment, the units of k1 and k2 are the sub-frames or short TTIs, the units of m1 and m2 are the SC-FDMA symbols, in another embodiment, the units of k1, k2 and m1 are the sub-frames or short TTIs and the unit of m2 is the SC-FDMA symbol). The method further includes: predefining that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols (in one embodiment, the unit of k is the sub-frame or short TTI and the unit of m2 is the SC-FDMA symbol), n is the natural number. The method further includes: predefining that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols (in one embodiment, the units of k1 and k2 are the sub-frames or short TTIs and the unit of m2 is the SC-FDMA symbol), n is the natural number. The method further includes: predefining that the DL control channel, which is transmitted in the sub-frame with the number of n or the short TTI and uses the DL DCI format, schedules the sPUCCH, which is transmitted on the (n+k)th timing domain location, or predefining that the DL control channel, which is transmitted in the sub-frame with the number of n or the short TTI and uses the DL, DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel, m is a value notified by the DL control, channel, units of k and m are sub-frames, short TTIs or SC-FDMA symbols (in one embodiment, the unit of k is the sub-frame or short TTI, the unit of m is the SC-FDMA symbol, in another embodiment, the units of k and m are the sub-frames or short TTIs), n is the natural number.

Wherein, m1 and m2 are different and need to be predefined, preconfigured or notified by the DL control channel for the sPUCCH and DMRS.

Optionally, in this embodiment, when multiple terminal Time Division Multiplexing (TDM) uses different UL short TTI transmission, multiple UL short TTI transmission share a same time domain location to transmit the DMRS and the DL control channel indicates that the DMRS is transmitted on a specific location of a time slot/sub-frame, e.g., on a first symbol of a time slot/sub-frame, or on other locations of a time slot/sub-frame.

Optionally, in this embodiment, when a terminal is consecutively scheduled in multiple UL short TTI transmission, the DL control channel indicates that the DMRS is transmitted between the multiple UL short TTIs, in which the terminal is scheduled, e.g., between the i-th UL short TTI and (i+1)th UL short TTI in the multiple UL short TTIs. The multiple UL short TTI transmission share a same time domain location to transmit the DMRS or the channel estimation of the multiple UL short TTI transmission is based on the same DMRS.

In this embodiment, the DMRS location of the UL transmission is obtained via the DL control channel. Therefore, an insert location of the DMRS is determined according to the transmission situation of the sPUSCH/sPUCCH. On the one hand, the DMRS overhead of the short TTI transmission may be reduced. On the other hand, the demodulation performance of the DMRS may be improved.

Figure 5:
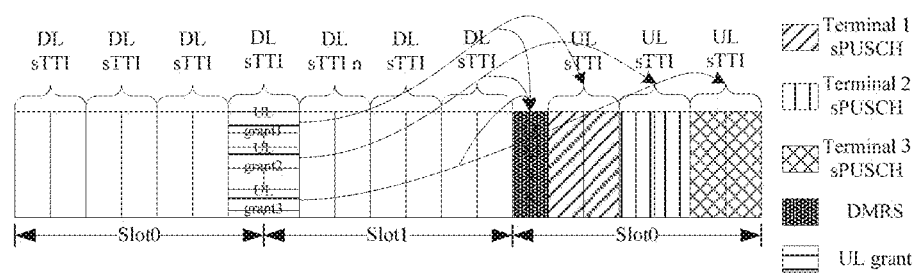
FIG. 5 is a schematic diagram illustrating that an eNB determines to continuously dispatch three terminals to perform sPUSCH transmission, length of which is two SC-FDMA symbols according to various embodiments of the present disclosure.

In some embodiments, the eNB determines to successively schedule three terminals in one time slot to perform sPUSCH transmission with the length of two SC-FDMA symbols, as shown in FIG. 5, the specific process is as follows:

The eNB Side:

The eNB transmits the UL grant 1 in the sub-frame with the number of n or short TTI to schedule the terminal 1, so that the terminal 1 transmits the sPUSCH on the (n+k+m1)th time domain location, the DMRS of the sPUSCH is transmitted on the (n+k+m2)th time domain location. Wherein, m1 is indicated by a first index domain carried in the UL grant), m2 is indicated by a second index domain carried in the UL grant 1, k is predefined. For instance, the unit of k is the length of the short TTI of the sPUSCH. Units of m1 and m2 are the SC-FDMA symbols. That is, for instance, k=4, m1=1, m2=0, it indicates that the sPUSCH is transmitted on a time domain location, which delays k=4 short TTIs and m1=1 SC-FDMA symbol in relative to the sub-frame with the number of n or short TTI (the starting position). That is, the sPUSCH is started to be transmitted on the eighth SC-FDMA symbol, which is behind the sub-frame with the number of n or short TTI and the DMRS is transmitted on the time domain location, which delays k=4 short TTIs and m2=0 SC-FDMA symbol in relative to the sub-frame with the number of n or short TTI. That is, the DMRS is transmitted on the seventh SC-FDMA symbol, which is behind the sub-frame with the number n or the short TTI.

Similarly, the eNB transmits the UL grant 2 in the sub-frame with the number of n or short TTI to schedule the terminal 2, so that the terminal 2 transmits the sPUSCH on the (n+k+m1)th time domain location, the DMRS of the sPUSCH is transmitted on the (n+k+m2)th time domain location. For instance, the UL grant 2 indicates m1=3 and m2=0, which denotes that the sPUSCH is transmitted on a time domain location, which delays k=4 short TTIs and m1=3 SC-FDMA symbols in relative to the sub-frame with the number of n or short TTI. That is, the sPUSCH is started to be transmitted on the tenth SC-FDMA symbol, which is behind the sub-frame with the number of n or short TTI and the DMRS is transmitted on the time domain location, which delays k=4 short TTIs and m2=0 SC-FDMA symbol in relative to the sub-frame with the number of n or short TTI. That is, the DMRS is transmitted on the seventh SC-FDMA symbol, which is behind the sub-frame with the number n or the short TTI. Certainly, the eNB also may transmit the UL grant 2 in other sub-frames or short TTIs. Via adjusting the values of m1 and m2, it also may be implemented that the terminal 2 is scheduled on the above time domain location to perform the sPUSCH and DMRS transmission.

Similarly, the eNB transmits the UL grant 3 in the sub-frame with the number of n or short TTI to schedule the terminal 3, so that the terminal 3 transmits the sPUSCH on the (n+k+m1)th time domain location, the DMRS of the sPUSCH is transmitted on the (n+k+m2)th time domain location. For instance, the UL grant 3 indicates m1=5 and m2=0, which denotes that the sPUSCH is transmitted on a time domain location, which delays k=4 short TTIs and m1=5 SC-FDMA symbols in relative to the sub-frame with the number of n or short TTI. That is, the sPUSCH is started to be transmitted on the twelfth SC-FDMA symbol, which is behind the sub-frame with the number of n or short TTI and the DMRS is transmitted oil the time domain location, which delays k=4 short TTIs and m2=0 SC-FDMA symbol in relative to the sub-frame with the number of n or short TTI. That is, the DMRS is transmitted on the seventh SC-FDMA symbol, which is behind the sub-frame with the number n or the short TTI. Certainly, the eNB also may transmit the UL grant 3 in other sub-frames or short TTIs. Via adjusting the values of m1 and m2, it also may be implemented that the terminal 3 is scheduled on the above time domain location to perform the sPUSCH and DMRS transmission.

Terminal Side:

The terminal 1 receives the UL grant 1 in the sub-frame with the number of n or short TTI, determines to transmit the sPUSCH on the (n+k+m1)th time domain location and transmits the DMRS of the sPUSCH on the (n+k+m2)th time domain location. Wherein, m1 is indicated by a first index domain carried in the UL grant 1, m2 is indicated by a second index domain carried in the UL grant 1, k is predefined. For instance, the unit of k is the length of the short TTI of the sPUSCH. Units of m1 and m2 are the SC-FDMA symbols. That is, for instance, k=4, m1=1, m2=0, it indicates that the terminal 1 transmits the sPUSCH on a time domain location, which delays k=4 short TTIs and m1=1 SC-FDMA symbol in relative to the sub-frame with the number of n or short TTI. That is, the sPUSCH is started to be transmitted on the eighth SC-FDMA symbol, which is behind the sub-frame with the number of n or short TTI and the DMRS is transmitted on the time domain location, which delays k=4 short. TTIs and m2=0 SC-FDMA symbol in relative to the sub-frame with the number of n or short TTI. That is, the DMRS is transmitted on the seventh SC-FDMA symbol, which is behind the sub-frame with the number n or the short TTI.

Similarly, the terminal 2 receives the UL grant 2 in the sub-frame with the number of n or short TTI and determines to transmit the sPUSCH on the (n+k+m1)th time domain location and transmit the DMRS of the sPUSCH on the (n+k+m2)th time domain location. For instance, the UL grant 2 indicates m1=3 and m2=0, which denotes that the terminal 2 transmits the sPUSCH on a time domain location, which delays k=4 short TTIs and m1=3 SC-FDMA symbols in relative to the sub-frame with the number of n or short TTI. That is, the sPUSCH is started to be transmitted on the tenth SC-FDMA symbol, which is behind the sub-frame with the number of n or short TTI and the DMRS is transmitted on the time domain location, which delays k=4 short TTIs and m2=0 SC-FDMA symbol in relative to the sub-frame with the number of n or short TTI. That is, the DMRS is transmitted on the seventh SC-FDMA symbol, which is behind the sub-frame with the number n or the short TTI. Certainly, the terminal 2 also may receive the UL grant 2 in other sub-frames or short TTIs. By obtaining the values of m1 and m2, it also may be implemented that the sPUSCH and DMRS transmission is performed on the above time domain location.

Similarly, the terminal 3 receives the UL grant 3 in the sub-frame with the number of n or short TTI and determines to transmit the sPUSCH on the (n+k+m1)th time domain location and transmit the DMRS of the sPUSCH on the (n+k+m2)th time domain location. For instance, the UL grant 3 indicates m1=5 and m2=0, which denotes that the terminal 3 transmits the sPUSCH on a time domain location, which delays k=4 short TTIs and m1=5 SC-FDMA symbols in relative to the sub-frame with the number of n or short TTI. That is, the sPUSCH is started to be transmitted on the twelfth SC-FDMA symbol, which is behind the sub-frame with the number of n or short TTI and the DMRS is transmitted on the time domain location, which delays k=4 short TTIs and m2=0 SC-FDMA symbol in relative to the sub-frame with the number of n or short TTI. That is, the DMRS is transmitted on the seventh SC-FDMA symbol, which is behind the sub-frame with the number n or the short TTI. Certainly, the terminal 3 also may receive the UL grant 3 in other sub-frames or short TTIs. Via adjusting the values of m1 and m2, it also may be implemented that the sPUSCH and DMRS transmission is performed on the above time domain location.

Figure 6:
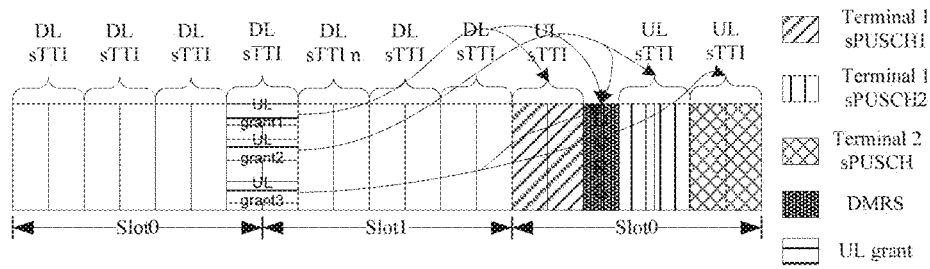
FIG. 6 is a schematic diagram illustrating a dispatch mode according to various embodiments of the present disclosure.

In the above embodiments, when the eNB determines that a terminal has multiple consecutive sPUSCH transmission, an indication that the DMRS is transmitted between the multiple sPUSCH of the terminal may be set. For instance, referring to the scheduling mode shown in FIG. 6, the scheduling timing of the sPUSCH and DMRS is similar to the above process, which is not repeated here.

In the above embodiment, the implementation process that the scheduling timing is defined as other formats are the similar, which are not repeated here. When the transmission time of the DMRS is the lead of sPUSCH, the value of m2 may be a negative value. The implementation process of replacing all or partial sPUSCHs as the sPUCCHs are the similar, what is only needed is replacing the corresponding UL grant with the DL grant, which is not repeated here.

Figure 7:
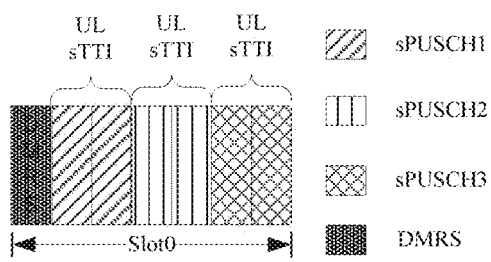
FIG. 7 is a schematic diagram illustrating a DMRS pattern according to various embodiments of the present disclosure.
Figure 8:
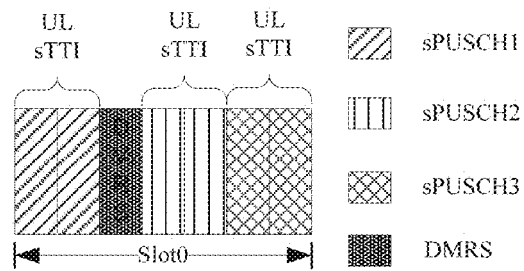
FIG. 8 is a schematic diagram illustrating a DMRS pattern according to various embodiments of the present disclosure.

In some embodiments, the standard protocol predefines two kinds of DMRS patterns shown in FIG. 7 and FIG. 8. The eNB may select one kind of DMRS pattern according to the actual scheduling situation of the current time slot and notify the terminal of the selected DMRS pattern via the DL control channel. The terminal determines the DMRS locations in one time slot according to the DMRS pattern notified via the DL control channel and determines the transmission locations of the sPUSCH according to the scheduling timing.

In the above embodiment, the DL sTTI and UL sTTI may use the same frequency resource, i.e., the TDD mode and also may use different frequency resources, i.e., the FDD mode. Therefore, the methods in the present disclosure are applicable to the TDD system and FDD system.

Figure 9:
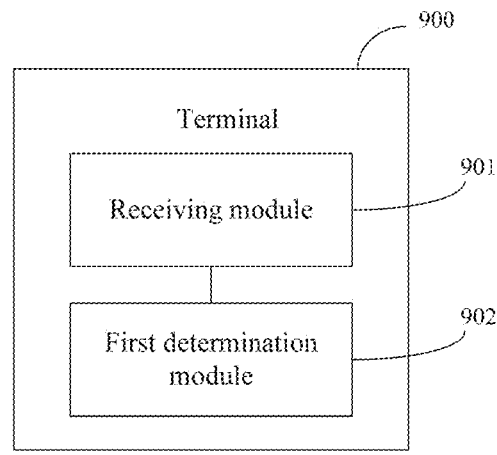
FIG. 9 is a schematic diagram illustrating structure of a terminal according to various embodiments of the present disclosure.

In some embodiments, referring to FIG. 9, FIG. 9 illustrates a terminal. The terminal 900 includes: a receiving module 901, to receive a DownLink (DL) control channel and a first determination module 902, to determine a transmission location of an UpLink (UL) DeModulation Reference Signal (DMRS) according to the DL control channel.

In this embodiment, optionally, the DL control channel is a DL control channel with an UL Downlink Control Information (DCI) format. The first determination module is further to determine, according to the DL control channel, the transmission location of the DMRS of an sPUSCH, which is scheduled by the DL control channel.

In this embodiment, optionally, the sPUSCH and DMRS use different scheduling timings.

In this embodiment, optionally, the terminal further includes: a first configuration module, to predefine that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number. Alternative, the first configuration module is further to predefine that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number. Alternatively, the first configuration module is further to predefine that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number. Alternatively, the first configuration module is further to predefine that the DL control channel which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m1 are sub-frames, short TTIs or SC-FDMA symbols, n is the natural number. Alternatively, the first configuration module is further to predefine that the DL control channel, which is transmitted in the sub-frame with the number of n or the short TTI and uses the UL DCI format, schedules the sPUSCH, which is transmitted on the (n+k)th timing domain location, or predefine that the DL control channel, which is transmitted in the sub-frame with the number of n or the short TTI and uses the UL DCI format, schedules the sPUSCH, which is transmitted, on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and its are sub-frames, short TTIs or SC-FDMA symbols, n is the natural number.

In this embodiment, optionally, the terminal further includes: a second configuration module, to predefine multiple UL DMRS patterns. Each DMRS pattern at least includes division of each short TTI and a location, at which the DMRS is located, in each sub-frame or time slot, or each DMRS pattern at least includes a relative location relationship between the DMRS and the short TTI. An indication field of the DL control channel indicates one of the predefined multiple UL DMRS S patterns.

In this embodiment, optionally, the DL control channel is a DL control channel using a DL DCI format. The determination module is further to determine, according to the DL control channel, the transmission location of the DMRS, which transmits the sPUCCH of ACK/NACK feedback information corresponding to the DL control channel.

In this embodiment, optionally, the sPUCCH and DMRS use different scheduling timings.

In this embodiment optionally, the terminal further includes: a third configuration module, to predefine that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number. Alternatively, the third configuration module is further to predefine that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number.

Alternatively, the third configuration module is further to predefine that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number. Alternatively, the third configuration module is further to predefine that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number. Alternatively, the third configuration module is further to predefine that the DL control channel, which is transmitted in the sub-frame with the number of n or the short TTI and uses the DL DCI format, schedules the sPUCCH, which is transmitted on the (n+k)th timing domain location, or predefine that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

In this embodiment, optionally, when multiple terminal Time Division Multiplexing (TDM) uses different UL short TTI transmission, multiple UL short TTI transmission shares a same time domain location to transmit the DMRS and the DL control channel indicates that the DMRS is transmitted on a specific location of a time slot/sub-frame.

In this embodiment, optionally, when a terminal is consecutively scheduled in multiple UL short TTI transmission, the DL control channel indicates that the DMRS is transmitted between the multiple UL short TTIs, in which the terminal is scheduled.

In this embodiment, the DMRS location of the UL transmission is obtained via the DL control channel. Therefore, an insert location of the DMRS is determined according to the transmission situation of the sPUSCH/sPUCCH. On the one hand, the DMRS overhead of the short TTI transmission may be reduced. On the other hand, the demodulation performance of the DMRS may be improved.

Figure 10:
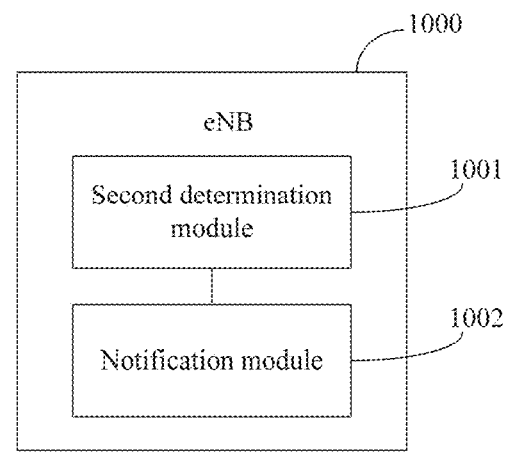
FIG. 10 is a schematic diagram illustrating structure of an eNB according to various embodiments of the present disclosure.

In some embodiments, referring to FIG. 10, FIG. 10 illustrates an eNB. The eNB 1000 includes: a second determination module 1001, to determine a transmission location of an UpLink (UL) DeModulation Reference Signal (DMRS) and a notification module 1002, to transmit a DownLink (DL) control channel to notify a terminal of determining information of the transmission location of the UL DMRS.

In this embodiment, optionally, the DL control channel is a DL control channel with an UL Downlink Control Information (DCI) format. The second determination is further to determine the transmission location of the DMRS of an sPUSCH, which is scheduled by the DL control channel and notify the terminal of determining the information of the transmission location of the DMRS via the DL control channel.

In this embodiment, optionally, the sPUSCH and DMRS use different scheduling timings.

In this embodiment, optionally, the eNB further includes: a fourth configuration module, to predefine that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number. Alternatively, the fourth configuration module is further to predefine that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number. Alternatively, the fourth configuration module is further to predefine that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number. Alternatively, the fourth configuration module is further to predefine that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number. Alternatively, the fourth configuration module is further to predefine that the DL control channel, which is transmitted in the sub-frame with the number of n or the short TTI and uses the UL DCI format, schedules the sPUSCH, which is transmitted on the (n+k)th timing domain location, or predefine that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS S index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number.

In this embodiment, optionally, the eNB further includes: a fifth configuration module, to predefine multiple UL DMRS patterns. Each DMRS pattern at least includes division of each short TTI and a location, at which the DMRS is located, in each sub-frame or time slot, or each DMRS pattern at least includes a relative location relationship between the DMRS and the short TTI. An indication field of the DL control channel indicates one of the predefined multiple UL DMRS patterns.

In this embodiment, optionally, the DL control channel is a DL control channel using a DL DCI format. The second determination module is further to determine the transmission location of the DMRS, which transmits the sPUCCH of ACK/NACK feedback information corresponding to the DL control channel and notify the terminal of determining the information of the transmission location of the DMRS via the DL control channel.

In this embodiment, optionally, the sPUCCH and DMRS use different scheduling timings.

In this embodiment, optionally, the eNB further includes a sixth configuration module, to predefine that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS S of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or SC-FDMA symbols. Alternatively, the sixth configuration module is further to predefine that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols. Alternatively, the sixth configuration module is further to predefine that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols. Alternatively, the sixth configuration module is further to predefine that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols. Alternatively, the sixth configuration module is further to predefine that the DL control channel, which is transmitted in the sub-frame with the number of n or the short TTI and uses the DL DCI format, schedules the sPUCCH, which is transmitted on the (n+k)th timing domain location, or predefine that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols.

In this embodiment, optionally, when multiple terminal Time Division Multiplexing (TDM) uses different UL short TTI transmission, multiple UL short TTI transmission share a same time domain location to transmit the DMRS and the DL control channel indicates that the DMRS is transmitted on a specific location of a time slot/sub-frame.

In this embodiment, optionally, when a terminal is consecutively scheduled in multiple UL short TTI transmission, the DL control channel indicates that the DMRS is transmitted between the multiple DL short TTIs, in which the terminal is scheduled.

In this embodiment, the DMRS location of the UL transmission is obtained via the DL control channel. Therefore, an insert location of the DMRS is determined according to the transmission situation of the sPUSCH/sPUCCH. On the one hand, the DMRS overhead of the short TTI transmission may be reduced. On the other hand, the demodulation performance of the DMRS may be improved.

Figure 11:
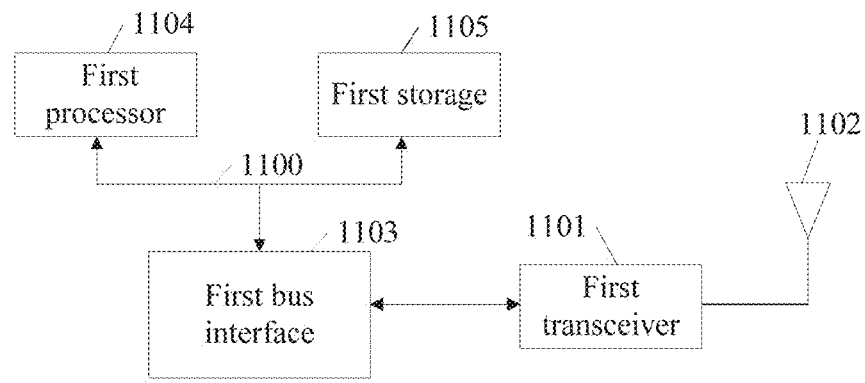
FIG. 11 is a schematic diagram illustrating structure of a terminal according to various embodiments of the present disclosure.

In some embodiments, referring to FIG. 11, embodiments of the present disclosure provide another structure of the terminal. The terminal includes; a first transceiver 1101, to receive and transmit data under control of a first processor 1104, specifically to receive the DL control channel. The first processor 1104 is to read programs in a first storage 1105 and execute following processes: determining a transmission location of an Uplink (UL) DeModulation Reference Signal (DMRS) according to the DL control channel.

In FIG. 11, the bus architecture (represented by first bus 1100) may include any number of interconnected buses and bridges. The first bus 1100 links various circuits including one or multiple processors, which are represented by the first processor 1104, and a storage, which is represented by the first storage 1105. The first bus 1100 may link various other circuits, such as a peripheral device, a voltage stabilizer and a power management circuit, etc., which are well known to those skilled in the art and are not further described in the present disclosure. The first bus interface 1103 provides an interface between the first bus 1100 and the first transceiver 1101. The first transceiver 1101 may be an element or multiple elements, such as multiple receivers and transmitters and are configured to provide a unit, which communicates with other devices on the transmission medium. The data processed by the first processor 1104 is transmitted on the wireless medium via the first transceiver 1101 and the first antenna 1102. Further, the first antenna 1102 receives the data and transmits the data to the first processor 1104 via the first transceiver 1101.

The first processor 1104 is responsible for managing the first bus 1100 and ordinary processing and further provides various functions, such as peripheral interfacing, voltage regulation, power management and other control functions. While the first storage 1105 may be used to store data used by the first processor 1104 in the process of executing operations. Specifically, the first processor 1104 may be a Central Processing Unit (CPU), an Application Specific Integrated Circuit (ASIC), a Field Programmable Gate Array (FPGA) and a Complex Programmable Logic Device (CPLD).

Optionally, the DL control channel is a DL control channel with an UL Downlink Control Information (DCI) format.

Optionally, the first processor 1104 is further to determine, according to the DL control channel, the transmission location of the DMRS of an sPUSCH, which is scheduled by the DL control channel.

Optionally, the sPUSCH and DMRS are different scheduling timings.

Optionally, the first processor 1104 is further to predefine that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or SC-FDMA symbols, n is natural number. Alternatively, the first processor 1104 is further to predefine that the DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number. Alternatively, the first processor 1104 is further to predefine that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number. Alternatively, the first processor 1104 is further to predefine that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL, control channel, units of k1, k2 and m2 are sub-frames, short TTIs or SC-FDMA symbols, n is the natural number. Alternatively, the first processor 1104 is further to predefine that the DL control channel, which is transmitted in the sub-frame with the number of n or the short TTI and uses the UL DCI format, schedules the sPUSCH, which is transmitted on the (n+k)th timing domain location, or predefine that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, the first processor 1104 is further to predefine multiple UL DMRS patterns. Each DMRS pattern at least includes division of each short TTI and a location, at which the DMRS is located, in each sub-frame or time slot, or each DMRS pattern at least includes a relative location relationship between the DMRS and the short TTI. An indication field of the DL control channel indicates one of the predefined multiple UL DMRS patterns.

Optionally, the DL control channel is a DL control channel using a DL DCI format.

Optionally, the first processor 1104 is further to determine, according to the DL control channel, the transmission location of the DMRS, which transmits the sPUCCH of ACK/NACK feedback information corresponding to the DL control channel.

Optionally, the sPUCCH and DMRS use different scheduling timings.

Optionally, the first processor 1104 is further to predefine that the DL control channel, which is transmitted in a sub-frame with the number of n or a short Transmission Time Interval (TTI) and uses the DL DCI format, schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value, notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number. Alternatively, the first processor 1104 is further to predefine that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number. Alternatively, the first processor 1104 is further to predefine that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number. Alternatively, the first processor 1104 is further to predefine that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number. Alternatively, the first processor 1104 is further to predefine that the DL control channel, which is transmitted in the sub-frame with the number of n or the short TTI and uses the DL DCI format, schedules the sPUCCH, which is transmitted on the (n+k)th timing domain location, or predefine that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel m is a value notified by the DL control channel, units of k and m are sub-frames, short TTIs or SC-FDMA symbols, n is the natural number.

Optionally, when multiple terminal Time Division Multiplexing (TDM) uses different UL short TTI transmission, multiple UL short TTI transmission shares a same time domain location to transmit the DMRS and the DL control channel indicates that the DMRS is transmitted on a specific location of a time slot/sub-frame.

Optionally, when a terminal is consecutively scheduled in multiple UL short TTI transmission, the DL control channel indicates that the DMRS is transmitted between the multiple UL short TTIs, in which the terminal is scheduled.

Figure 12:
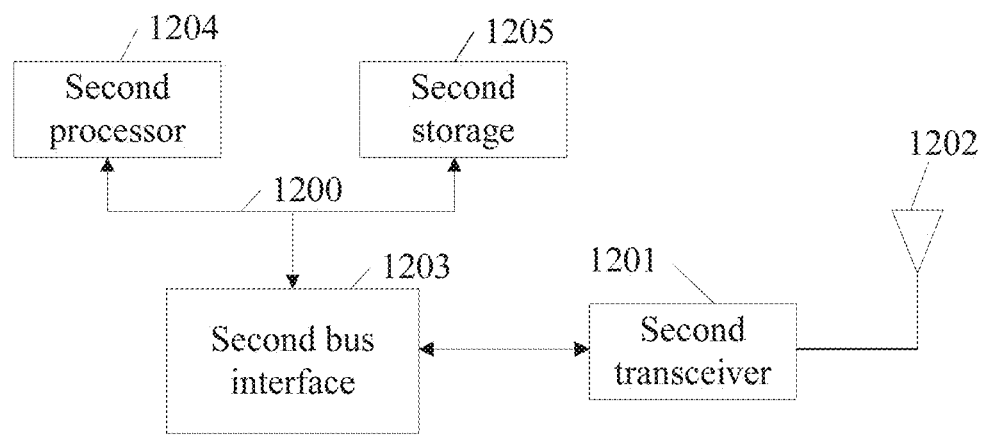
FIG. 12 is a schematic diagram illustrating structure of an eNB according to various embodiments of the present disclosure.

In some embodiments, referring to FIG. 12, embodiments of the present disclosure provide another structure of the eNB. The eNB includes: a second transceiver 1201, to receive and transmit data under control of a second processor 1204, specifically to transmit the DL control channel to notify the terminal of determining the transmission location of the UL DMRS.

The second processor 1204 is to read programs in a second storage 1205 and execute following processes; determining the transmission location of the UL DMRS.

In FIG. 12, the bus architecture (represented by second bus 1200) may include any number of interconnected buses and bridges. The second bus 1200 links various circuits including one or multiple processors, which are represented by the second processor 1204, and one or multiple storages, which is represented by the second storage 1205. The second bus 1200 may link various other circuits, such as a peripheral device, a voltage stabilizer and a power management circuit, etc., which are well known to those skilled in the art and are not further described in the present disclosure. The second bus interface 1203 provides an interface between the second bus 1200 and the second transceiver 1201. The second transceiver 1201 may be an element or multiple elements, such as multiple receivers and transmitters and are configured to provide a unit, which communicates with other devices on the transmission medium. The data processed by the second processor 1204 is transmitted on the wireless medium via the second transceiver 1203 and the second antenna 1202. Further, the second antenna 1202 receives the data and transmits the data to the second processor 1204 via the second transceiver 1201.

The second processor 1204 is responsible for managing the second bus 1200 and ordinary processing and further provides various functions, such as peripheral interfacing, voltage regulation, power management and other control functions. While the second storage 1205 may be used to store data used by the second processor 1204. Specifically, the second processor 1204 may be a Central Processing Unit (CPU), an Application Specific Integrated Circuit (ASIC), a Field Programmable Gate Array (FPGA) and a Complex Programmable Logic Device (CPLD).

Optionally, the DL control channel is a DL control channel with an UL Downlink Control Information (DCI) format.

Optionally, the second processor 1204 is further to determine the transmission location of the DMRS of an sPUSCH, which is scheduled by the DL control channel, and notify the terminal of determining the information of the transmission location of the DMRS via the DL control channel.

Optionally, the sPUSCH and DMRS use different scheduling timings.

Optionally, the second processor 1204 is further to predefine that the DL control channel, which is transmitted in a sub-frame with the number of n or a short Transmission Time Interval (TTI) and uses the UL DCI format, schedules the sPUSCH, which is transmitted on the (n+k+m1)th timing domain location, wherein the DMRS of the sPUSCH is transmitted on the (n+k+m2)th timing domain location or the DMRS of the sPUSCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number. In an alternative, the second processor 1204 is further to predefine that tire DL control channel, which is transmitted in the sub-frame with the number of n or the short TTI and uses the UL DCI format, schedules the sPUSCH, which is transmitted on the (n+k1+m1)th timing domain location, wherein the DMRS of the sPUSCH is transmitted on the (n+k2+m2)th timing domain location or the DMRS of the sPUSCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 ore sub-frames, short TTIs or SC-FDMA symbols, n is the natural number. In an alternative, the second processor 1204 is further to predefine that the DL control channel, which is transmitted in the sub-frame with the number of n or the short TTI and uses the UL DCI format, schedules the sPUSCH, which is transmitted on the (n+k)th timing domain location, wherein the DMRS of the sPUSCH is transmitted on the (n+k+m2)th timing domain location, k is a predefined value, a preconfigured value or a value notified by the DL, control channel, m2 is a value notified by the DL control channel, units of k and m2 are sub-frames, short TTIs or SC-FDMA symbols, n is the natural number. In an alternative, the second processor 1204 is further to predefine that the DL control channel, which is transmitted in the sub-frame with the number of n or the short TTI and uses the UL DCI format, schedules the sPUSCH, which is transmitted on the (n+k1)th timing domain location, wherein the DMRS of the sPUSCH is transmitted on the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number. In an alternative, the second processor 1204 is further to predefine that the DL control channel, which is transmitted in the sub-frame with the number of n or the short TTI and uses the UL DCI format, schedules the sPUSCH, which is transmitted on the (n+k)th timing domain location, or predefine that the DL control channel, which is transmitted in the sub-frame with the number of n or the short TTI and uses the UL DCI format, schedules the sPUSCH, which is transmitted on the (n+k+m)th timing domain location, wherein a DMRS index location is indicated in the DL control channel, the DMRS index location is number of an SC-FDMA symbol in a sub-frame or time slot, at which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, the second processor 1204 is further to predefine multiple UL DMRS patterns. Each DMRS pattern at least includes division of each short TTI and a location, at which the DMRS is located, in each sub-frame or time slot, or each DMRS pattern at least includes a relative location relationship between the DMRS and the short TTI. An indication field of the DL control channel indicates one of the predefined multiple UL DMRS S patterns.

Optionally, the DL control channel is a DL control channel using a DL DCI format.

Optionally, the second processor 1204 is further to determine the transmission location of the DMRS, which transmits the sPUCCH of ACK/NACK feedback information corresponding to the DL control channel and notify the terminal of determining the information of the transmission location of the DMRS via the DL control channel.

Optionally, the sPUCCH and DMRS use different scheduling timings.

Optionally, the second processor 1204 is further to predefine that the DL control channel, which is transmitted in a sub-frame with the number of n or a short Transmission Time Interval (TTI) and uses the DL DCI format schedules the sPUCCH, which is transmitted on the (n+k+m1)th timing domain location, wherein the DMRS of the sPUCCH is transmitted on the (n+k+m2)th timing domain location or the DMRS of the sPUCCH is transmitted on the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols. In an alternative, the second processor 1204 is further to predefine that the DL control channel, which is transmitted in the sub-frame with the number of n or the short TTI and uses the DL DCI format, schedules the sPUCCH, which is transmitted on the (n+k1+m1)th timing domain location, wherein the DMRS of the sPUCCH is transmitted on the (n+k2+m2)th timing domain location or the DMRS of the sPUCCH is transmitted on the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is natural number. In an alternative, the second processor 1204 is further to predefine that the DL control channel, which is transmitted in the sub-frame with the number of n or the short TTI and uses the DL DCI format, schedules the sPUCCH, which is transmitted on the (n+k)th timing domain location, wherein the DMRS of the sPUCCH is transmitted on the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number. In an alternative, the second processor 1204 is further to predefine that the DL control channel, which is transmitted in the sub-frame with the number of n or the short TTI and uses the DL DCI format, schedules the sPUCCH, which is transmitted on the (n+k1)th timing domain location, wherein the DMRS of the sPUCCH is transmitted on the (n+k2+m2)th timing domain location, k1 and k2 are predefined values, preconfigured values or values notified by the DL control channel m2 is a value notified by the DL control channel, units of k1, k2 and m2 are sub-frames, short TTIs or SC-FDMA symbols, n is natural number. In an alternative, the second processor 1204 is further to predefine that the DL control channel, which is transmitted in the sub-frame with the number of n or the short TTI and uses the DL DCI format, schedules the sPUCCH, which is transmitted on the (n+k)th timing domain location, or predefine that the DL control channel, which is transmitted in the sub-frame with the number of n or the short TTI and uses the DL DCI format, schedules the sPUCCH, which is transmitted on the (n+k+m)th timing domain location, wherein a DMRS index location is indicated in the DL control channel, the DMRS index location is number of an SC-FDMA symbol in a sub-frame or time slot, at which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

Optionally, when multiple terminal Time Division Multiplexing (TDM) uses different UL short TTI transmission, multiple UL short TTI transmission share a same time domain location to transmit the DMRS and the DL control channel indicates that the DMRS is transmitted on a specific location of a time slot/sub-frame.

Optionally, when a terminal is consecutively scheduled in multiple UL short TTI transmission, the DL control channel indicates that the DMRS is transmitted between the multiple DL short TTIs, in which the terminal is scheduled.

It should be understood that "one embodiment" means that specific characteristics, structure or features related to the embodiment are included in at least one embodiment of the present disclosure. Therefore, the appearances of the phrase "in one embodiment" in various places in the specification may or may not be all referring to the same embodiment. Further, these specific characteristics, structure or features can be combined in one or more embodiments in any appropriate manner.

In the various embodiments of this disclosure, it shall be understood that the ordinal size of the above procedures does not mean the sequencing of the execution order, which shall be determined by its function and internal logic, and shall not constitute any limitation to the implementation process of the embodiments of the present disclosure.

In addition, the terms "system" and "network" may be used interchangeably in the present disclosure.

It should be understood that the term "and/or" in the present disclosure is just a relation describing the correlative objects, indicating that there can be three kinds of relations, for example, A and/or B, can mean that A exists separately, A exists simultaneously with B, and B exists separately. In addition, the character "/" in the present disclosure generally means that the relationship between the correlative objects is a "or".

In the embodiments provided in this application, it shall be understood that "B corresponding to A" means that B is associated with A and B can be determined according to A. It should also be understood, however, that the determination of B according to A does not mean that B can be determined solely on the basis of A, but B can also be determined on the basis of A and/or other information.

In the several embodiments provided in this application, it should be understood that the disclosed methods and devices can be implemented in other ways. For example, the devices described in the above embodiment are only schematic, for example, the division of the units is just a logical functional division, while the actual implementation can have other divisions, such as multiple units or components can be combined with or can be integrated into another system, or some characteristics can be ignored, or are not executed. Another point is that the shown or discussed coupling, direct coupling or communication connection between each other may be indirect coupling or communication connection via some interfaces, devices or units, and also may be electrical connection, mechanical connection, or connection of other forms.

In addition, the functional units in each embodiment of the present disclosure can be integrated into a processing unit, or individually physically included, or two or more units can be integrated into a unit. The above integrated units can be implemented either in the form of hardware or in the form of hardware plus software functional units.

The integrated units described above, in the form of software functional units, can be stored in a computer-readable storage medium. The software function unit above is stored in a storage medium, including several instructions to enable a computer device (which can be a personal computer, server, or network-side device, etc.) to perform partial steps of transceiving method described in each embodiment of the present disclosure. The aforesaid storage medium includes: a U disk, a mobile hard disk, a read-only Memory (ROM), a Random Access Memory (RAM), disk or disc, and other media that can store program codes.

The foregoing only describes preferable embodiments of the present disclosure. It should be pointed out that on the premise of not deviating from the principle of the preset disclosure, those skilled in the art may make improvements and embellishments, which are also within the protection scope of the present disclosure.

What is claimed is:

1. A method for dynamically determining a transmission location of an UpLink (UL) DeModulation Reference Signal (DMRS), comprising:
   receiving, by a terminal, a DownLink (DL) control channel; and
   determining, by the terminal, the transmission location of the UL DMRS according to the DL control channel;
   wherein the method further includes at least one of the following modes:

first mode:
   the DL control channel is a DL control channel with an UL Downlink Control Information (DCI) format;
   determining, by the terminal, the transmission location of the UL DMRS according to the DL control channel includes: determining, by the terminal according to the DL control channel, the transmission location of the DMRS of a shortened Physical Uplink Shared CHannel (sPUSCH), which is scheduled by the DL control channel; when the first mode is adopted, the sPUSCH and DMRS use different scheduling timings;
   second mode:
   predefining multiple UL DMRS patterns, wherein each DMRS pattern at least includes division of each short TTI and a location of DMRS, in each sub-frame or slot, or each DMRS pattern at least includes a relative location relationship between the DMRS and the short TTI, an indication field of the DL control channel indicates one of the predefined multiple UL DMRS patterns;
   third mode:
   the DL control channel is a DL control channel with a DL DCI format;
   determining, by the terminal, the transmission location of the UL DMRS according to the DL control channel includes: determining, by the terminal according to the DL control channel, the transmission location of the DMRS of a shortened Physical Uplink Control Channel (sPUCCH) carrying ACK/NACK feedback information corresponding to the DL control channel.

2. The method according to claim 1, wherein when the third mode is adopted, the sPUCCH and DMRS use different scheduling timings.

3. The method according to claim 2, wherein when the first mode is adopted, the method further includes:
   predefining that the DL control channel with the UL DCI format, which is transmitted in a sub-frame with the index of n or in a short Transmission Time Interval (TTI) with index of n, schedules the sPUSCH, which is transmitted in the (n+k+m1)th timing domain location, wherein the DMRS of the sPUSCH is transmitted in the (n+k+m2)th timing domain location or the DMRS of the sPUSCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or,
   predefining that the DL control channel with the UL DCI format, which is transmitted in the sub-frame with the index of n or in the short TTI with index of n, schedules the sPUSCH, which is transmitted in the (n+k1+m1)th timing domain location, wherein the DMRS of the sPUSCH is transmitted in the (n+k2+m2)th timing domain location or the DMRS of the sPUSCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or,
   predefining that the DL control channel with the UL DCI format, which is transmitted in the sub-frame with the index of n or in the short TTI with index of n, schedules the sPUSCH, which is transmitted in the (n+k)th timing domain location, wherein the DMRS of the sPUSCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k1)th timing domain location, wherein the DMRS of the sPUSCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k)th timing domain location, or predefining that the DL control channel with the UL DCI format, which is transmitted in the sub-frame with the index of n or in the short TTI with index of n, schedules the sPUSCH, which is transmitted in the (n+k+m)th timing domain location, wherein a DMRS index location is indicated in the DL control channel, the DMRS index location is index of an SC-FDMA symbol in a sub-frame or slot, in which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number;

wherein when the third mode is adopted, the method further includes:

predefining that the DL control channel with the UL DCI format, which is transmitted in a sub-frame with the index of n or in a short Transmission Time Interval (TTI) with index of n, schedules the sPUCCH, which is transmitted in the (n+k+m1)th timing domain location, wherein the DMRS of the sPUCCH is transmitted in the (n+k+m2)th timing domain location or the DMRS of the sPUCCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or SC-FDMA symbols, n is natural number; or, predefining that the DL control channel with the UL DCI format, which is transmitted in the sub-frame with the index of n or in the short TTI with index of n, schedules the sPUCCH, which is transmitted in the (n+k1+m1)th timing domain location, wherein the DMRS of the sPUCCH is transmitted in the (n+k2+m2)th timing domain location or the DMRS of the sPUCCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k)th timing domain location, wherein the DMRS of the sPUCCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k1)th timing domain location, wherein the DMRS of the sPUCCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k)th timing domain location, or predefining that the DL control channel with the UL DCI format, which is transmitted in the sub-frame with the index of n or in the short TTI with index of n, schedules the sPUCCH, which is transmitted in the (n+k+m)th timing domain location, wherein a DMRS index location is indicated in the DL control channel, the DMRS index location is index of an SC-FDMA symbol in a sub-frame or slot, in which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

4. The method according to claim 1, wherein when multiple terminals transmit in different UL short TTIs with a Time Division Multiplexing (TDM) manner, multiple UL short TTIs shares a same time domain location to transmit the DMRS and the DL control channel indicates that the DMRS is transmitted on a specific location in a slot/sub-frame; and/or, when a terminal is consecutively scheduled in multiple UL short TTIs, the DL control channel indicates that the DMRS is transmitted among the multiple UL short TTIs, in which the terminal is scheduled.

5. A method for dynamically determining a transmission location of an UpLink (UL) DeModulation Reference Signal (DMRS), comprising:

determining, by an eNB, a transmission location of the UL DMRS; and transmitting, by the eNB, a DownLink (DL) control channel to notify a terminal of determining information of the transmission location of the UL DMRS;

wherein the method further includes at least one of the following modes:

first mode:

the DL control channel is a DL control channel with an UL Downlink Control Information (DCI) format;

determining, by the eNB, the transmission location of the UL DMRS includes: determining, by the eNB, the transmission location of the DMRS of a shortened Physical Uplink Shared Channel (sPUSCH), which is scheduled by the DL control channel, and notifying the terminal of determining the information of the transmission location of the DMRS via the DL control channel; when the first mode is adopted, the sPUSCH and DMRS use different scheduling timings;

second mode:

predefining multiple UL DMRS patterns, wherein each DMRS pattern at least includes division of each short TTI and a location of DMRS, in each sub-frame or slot, or each DMRS pattern at least includes a relative location relationship between the DMRS and the short TTI, an indication field of the DL control channel indicates one of the predefined multiple UL DMRS patterns;

third mode:

the DL control channel is a DL control channel with a DL DCI format;

determining, by the eNB, the transmission location of the UL DMRS includes: determining, by the eNB, the transmission location of the DMRS of a shortened Physical Uplink Control Channel (sPUCCH) carrying ACK/NACK feedback information corresponding to the DL control channel and notifying the terminal of determining the information of the transmission location of the DMRS via the DL control channel.

6. The method according to claim 5, wherein when the third mode is adopted, the sPUCCH and DMRS use different scheduling timings.

7. The method according to claim 6, wherein when the first mode is adopted, the method further includes:

predefining that the DL control channel with the UL DCI format, which is transmitted in a sub-frame with the index of n or in a short Transmission Time Interval (TTI) with index of n, schedules the sPUSCH, which is transmitted in the (n+k+m1)th timing domain location, wherein the DMRS of the sPUSCH is transmitted in the (n+k+m2)th timing domain location or the DMRS of the sPUSCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or, predefining that the DL control channel with the UL DCI format, which is transmitted in the sub-frame with the index of n or in the short TTI with index of n, schedules the sPUSCH, which is transmitted in the (n+k1+m1)th timing domain location, wherein the DMRS of the sPUSCH is transmitted in the (n+k2+m2)th timing domain location or the DMRS of the sPUSCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k)th timing domain location, wherein the DMRS of the sPUSCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k1)th timing domain location, wherein the DMRS of the sPUSCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k)th timing domain location, or predefining that the DL control channel with the UL DCI format, which is transmitted in the sub-frame with the index of n or in the short TTI with index of n, schedules the sPUSCH, which is transmitted in the (n+k+m)th timing domain location, wherein a DMRS index location is indicated in the DL control channel, the DMRS index location is index of an SC-FDMA symbol in a sub-frame or slot, in which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number;

wherein when the third mode is adopted, the method further includes:

predefining that the DL control channel with the UL DCI format, which is transmitted in a sub-frame with the index of n or in a short Transmission Time Interval (TTI) with index of n, schedules the sPUCCH, which is transmitted in the (n+k+m1)th timing domain location, wherein the DMRS of the sPUCCH is transmitted in the (n+k+m2)th timing domain location or the DMRS of the sPUCCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or SC-FDMA symbols; or, predefining that the DL control channel with the UL DCI format, which is transmitted in the sub-frame with the index of n or in the short TTI with index of n, schedules the sPUCCH, which is transmitted in the (n+k1+m1)th timing domain location, wherein the DMRS of the sPUCCH is transmitted in the (n+k2+m2)th timing domain location or the DMRS of the sPUCCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is natural number; or, predefining that the DL control channel with the UL DCI format, which is transmitted in the sub-frame with the index of n or in the short TTI with index of n, schedules the sPUCCH, which is transmitted in the (n+k)th timing domain location, wherein the DMRS of the sPUCCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k1)th timing domain location, wherein the DMRS of the sPUCCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k)th timing domain location, or predefining that the DL control channel with the UL DCI format, which is transmitted in the sub-frame with the index of n or in the short TTI with index of n, schedules the sPUCCH, which is transmitted in the (n+k+m)th timing domain location, wherein a DMRS index location is indicated in the DL control channel, the DMRS index location is index of an SC-FDMA symbol in a sub-frame or slot, in which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

8. The method according to claim 5, wherein when multiple terminals transmit in different UL short TTIs with a Time Division Multiplexing (TDM) manner, multiple UL short TTIs share a same time domain location to transmit the DMRS and the DL control channel indicates that the DMRS is transmitted on a specific location in a slot/sub-frame; and/or, when a terminal is consecutively scheduled in multiple UL short TTIs, the DL control channel indicates that the DMRS is transmitted among the multiple DL short TTIs, in which the terminal is scheduled.

9. An eNB for implementing the method of claim 5, comprising: a storage, transceiver and a processor; wherein
the transceiver is to receive and transmit data under control of the processor;
the processor is to read programs in the storage and execute following processes:
determining a transmission location of an UpLink (UL) DeModulation Reference Signal (DMRS); and
transmitting a DownLink (DL) control channel to notify a terminal of determining information of the transmission location of the UL DMRS;
wherein the processor is to read programs in the storage and execute at least one of the following modes:
first mode:
the DL control channel is a DL control channel with an UL Downlink Control Information (DCI) format;
determining, by the eNB, the transmission location of the UL DMRS includes: determining, by the eNB, the transmission location of the DMRS of a shortened Physical Uplink Shared Channel (sPUSCH), which is scheduled by the DL control channel, and notifying the terminal of determining the information of the transmission location of the DMRS via the DL control channel; when the first mode is adopted, the sPUSCH and DMRS use different scheduling timings;
second mode:
predefining multiple UL DMRS patterns, wherein each DMRS pattern at least includes division of each short TTI and a location of DMRS, in each sub-frame or slot, or each DMRS pattern at least includes a relative location relationship between the DMRS and the short TTI, an indication field of the DL control channel indicates one of the predefined multiple UL DMRS patterns;
third mode:
the DL control channel is a DL control channel with a DL DCI format;
determining, by the eNB, the transmission location of the UL DMRS includes: determining, by the eNB, the transmission location of the DMRS of a shortened Physical Uplink Control Channel (sPUCCH) carrying ACK/NACK feedback information corresponding to the DL control channel and notifying the terminal of determining the information of the transmission location of the DMRS via the DL control channel.

10. A terminal, comprising: a storage, a transceiver and a processor, wherein
the transceiver is to receive and transmit data under control of the processor;
the processor is to read programs in the storage and execute following processes:
receiving a DownLink (DL) control channel; and
determining a transmission location of an UpLink (UL) DeModulation Reference Signal (DMRS) according to the DL control channel;
wherein the processor is to read programs in the storage and execute at least one of the following modes:
first mode:
the DL control channel is a DL control channel with an UL Downlink Control Information (DCI) format;
determining, by the terminal, the transmission location of the UL DMRS according to the DL control channel includes: determining, by the terminal according to the DL control channel, the transmission location of the DMRS of a shortened Physical Uplink Shared CHannel (sPUSCH), which is scheduled by the DL control channel; when the first mode is adopted, the sPUSCH and DMRS use different scheduling timings;
second mode:
predefining multiple UL DMRS patterns, wherein each DMRS pattern at least includes division of each short TTI and a location of DMRS, in each sub-frame or slot, or each DMRS pattern at least includes a relative location relationship between the DMRS and the short TTI, an indication field of the DL control channel indicates one of the predefined multiple UL DMRS patterns;

third mode:

the DL control channel is a DL control channel with a DL DCI format;

determining, by the terminal, the transmission location of the UL DMRS according to the DL control channel includes: determining, by the terminal according to the DL control channel, the transmission location of the DMRS of a shortened Physical Uplink Control Channel (sPUCCH) carrying ACK/NACK feedback information corresponding to the DL control channel.

11. The terminal according to claim 10, wherein when the third mode is adopted, the sPUCCH and DMRS use different scheduling timings.

12. The terminal according to claim 11, wherein when the first mode is adopted, the processor is to read programs in the storage and execute following processes:

predefining that the DL control channel with the UL DCI format, which is transmitted in a sub-frame with the index of n or in a short Transmission Time Interval (TTI) with index of n, schedules the sPUSCH, which is transmitted in the (n+k+m1)th timing domain location, wherein the DMRS of the sPUSCH is transmitted in the (n+k+m2)th timing domain location or the DMRS of the sPUSCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or, predefining that the DL control channel with the UL DCI format, which is transmitted in the sub-frame with the index of n or in the short TTI with index of n, schedules the sPUSCH, which is transmitted in the (n+k1+m1)th timing domain location, wherein the DMRS of the sPUSCH is transmitted in the (n+k2+m2)th timing domain location or the DMRS of the sPUSCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k)th timing domain location, wherein the DMRS of the sPUSCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k1)th timing domain location, wherein the DMRS of the sPUSCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k)th timing domain location, or predefining that the DL control channel with the UL DCI format, which is transmitted in the sub-frame with the index of n or in the short TTI with index of n, schedules the sPUSCH, which is transmitted in the (n+k+m)th timing domain location, wherein a DMRS index location is indicated in the DL control channel, the DMRS index location is index of an SC-FDMA symbol in a sub-frame or slot, in which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number;

wherein when the first mode is adopted, the processor is to read programs in the storage and execute following processes:

predefining that the DL control channel with the UL DCI format, which is transmitted in a sub-frame with the index of n or in a short Transmission Time Interval (TTI) with index of n, schedules the sPUCCH, which is transmitted in the (n+k+m1)th timing domain location, wherein the DMRS of the sPUCCH is transmitted in the (n+k+m2)th timing domain location or the DMRS of the sPUCCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or SC-FDMA symbols, n is natural number; or, predefining that the DL control channel with the UL DCI format, which is transmitted in the sub-frame with the index of n or in the short TTI with index of n, schedules the sPUCCH, which is transmitted in the (n+k1+m1)th timing domain location, wherein the DMRS of the sPUCCH is transmitted in the (n+k2+m2)th timing domain location or the DMRS of the sPUCCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k)th timing domain location, wherein the DMRS of the sPUCCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k1)th timing domain location, wherein the DMRS of the sPUCCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k)th timing domain location, or predefining that the DL control channel with the UL DCI format, which is transmitted in the sub-frame with the index of n or in the short TTI with index of n, schedules the sPUCCH, which is transmitted in the (n+k+m)th timing domain location, wherein a DMRS index location is indicated in the DL control channel, the DMRS index location is index of an SC-FDMA symbol in a sub-frame or slot, in which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

13. The terminal according to claim 10, wherein when multiple terminals transmit in different UL short TTIs with a Time Division Multiplexing (TDM) manner, multiple UL short TTIs shares a same time domain location to transmit the DMRS and the DL control channel indicates that the DMRS is transmitted on a specific location in a slot/sub-frame; and/or, when a terminal is consecutively scheduled in multiple UL short TTIs, the DL control channel indicates that the DMRS is transmitted among the multiple UL short TTIs, in which the terminal is scheduled.

14. The eNB according to claim 9, wherein when the third mode is adopted, the sPUCCH and DMRS use different scheduling timings.

15. The eNB according to claim 14, wherein when the first mode is adopted, the processor is to read programs in the storage and execute following processes:

predefining that the DL control channel with the UL DCI format, which is transmitted in a sub-frame with the index of n or in a short Transmission Time Interval (TTI) with index of n, schedules the sPUSCH, which is transmitted in the (n+k+m1)th timing domain location, wherein the DMRS of the sPUSCH is transmitted in the (n+k+m2)th timing domain location or the DMRS of the sPUSCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or Single-Carrier Frequency Division Multiple Access (SC-FDMA) symbols, n is natural number; or, predefining that the DL control channel with the UL DCI format, which is transmitted in the sub-frame with the index of n or in the short TTI with index of n, schedules the sPUSCH, which is transmitted in the (n+k1+m1)th timing domain location, wherein the DMRS of the sPUSCH is transmitted in the (n+k2)th timing domain location or the DMRS of the sPUSCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k)th timing domain location, wherein the DMRS of the sPUSCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k1)th timing domain location, wherein the DMRS of the sPUSCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUSCH, which is transmitted in the (n+k)th timing domain location, or predefining that the DL control channel with the UL DCI format, which is transmitted in the sub-frame with the index of n or in the short TTI with index of n, schedules the sPUSCH, which is transmitted in the (n+k+m)th timing domain location, wherein a DMRS index location is indicated in the DL control channel, the DMRS index location is index of an SC-FDMA symbol in a sub-frame or slot, in which the sPUSCH transmission scheduled by the DL control channel is located, k is predefined value, a preconfigured value or a value notified by the DL control channel, m is a value notified by the DL control channel, units of k and m are sub-frames, short TTIs or SC-FDMA symbols, n is the natural number;

wherein when the third mode is adopted, the processor is to read programs in the storage and execute following processes:

predefining that the DL control channel with the UL DCI format, which is transmitted in a sub-frame with the index of n or in a short Transmission Time Interval (TTI) with index of n, schedules the sPUCCH, which is transmitted in the (n+k+m1)th timing domain location, wherein the DMRS of the sPUCCH is transmitted in the (n+k+m2)th timing domain location or the DMRS of the sPUCCH is transmitted in the (n+k+m1+m2)th timing domain location, k is a predefined value, a preconfigured value or a value notified by the DL control channel, m1 and m2 are values notified by the DL control channel, units of k, m1 and m2 are sub-frames, short TTIs or SC-FDMA symbols; or, predefining that the DL control channel with the UL DCI format, which is transmitted in the sub-frame with the index of n or in the short TTI with index of n, schedules the sPUCCH, which is transmitted in the (n+k1+m1)th timing domain location, wherein the DMRS of the sPUCCH is transmitted in the (n+k2+m2)th timing domain location or the DMRS of the sPUCCH is transmitted in the (n+k2+m1+m2)th timing domain location, k1 and k2 are predefined values, preconfigured values or values notified by the DL control channel, m1 and m2 are values notified by the DL control channel, units of k1, k2, m1 and m2 are sub-frames, short TTIs or SC-FDMA symbols, n is natural number; or, predefining that the DL control channel with the UL DCI format, which is transmitted in the sub-frame with the index of n or in the short TTI with index of n, schedules the sPUCCH, which is transmitted in the (n+k)th timing domain location, wherein the DMRS of the sPUCCH is transmitted in the (n+k+m2)th timing domain location, k is a predefined value, a preconfigured value or a value notified by the DL control channel, m2 is a value notified by the DL control channel, units of k and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k1)th timing domain location, wherein the DMRS of the sPUCCH is transmitted in the (n+k2+m2)th timing domain location, k1 and k2 are predefined values, preconfigured values or values notified by the DL control channel, m2 is a value notified by the DL control channel, units of k1, k2 and m2 are sub-frames, short TTIs or SC-FDMA symbols, n is the natural number; or, predefining that the DL control channel with the UL DCI format, which is transmitted in the sub-frame with the index of n or in the short TTI with index of n, schedules the sPUCCH, which is transmitted in the (n+k)th timing domain location, or predefining that the DL control channel with the UL DCI format, which is transmitted in the sub-frame with the index of n or in the short TTI with index of n, schedules the sPUCCH, which is transmitted in the (n+k+m)th timing domain location, wherein a DMRS index location is indicated in the DL control channel, the DMRS index location is index of an SC-FDMA symbol in a sub-frame or slot, in which the sPUCCH transmission corresponding to the DL control channel is located, k is predefined value, a preconfigured value or a value notified by the DL control channel, m is a value notified by the DL control channel, units of k and m are sub-frames, short TTIs or SC-FDMA symbols, n is the natural number.

16. The eNB according to claim 9, wherein when multiple terminals transmit in different UL short TTIs with a Time Division Multiplexing (TDM) manner, multiple UL short TTIs share a same time domain location to transmit the DMRS and the DL control channel indicates that the DMRS is transmitted on a specific location in a slot/sub-frame; and/or, when a terminal is consecutively scheduled in multiple UL short TTIs, the DL control channel indicates that the DMRS is transmitted among the multiple DL short TTIs, in which the terminal is scheduled.

* * * * *